E. A. SPERRY.
WIND DRIVEN GENERATOR FOR AIRCRAFT.
APPLICATION FILED DEC. 2, 1916.

1,362,753.

Patented Dec. 21, 1920.
2 SHEETS—SHEET 1.

INVENTOR
ELMER A. SPERRY
BY
Herbert H. Thompson
ATTORNEY.

E. A. SPERRY.
WIND DRIVEN GENERATOR FOR AIRCRAFT.
APPLICATION FILED DEC. 2, 1916.
1,362,753.
Patented Dec. 21, 1920.
2 SHEETS—SHEET 2.
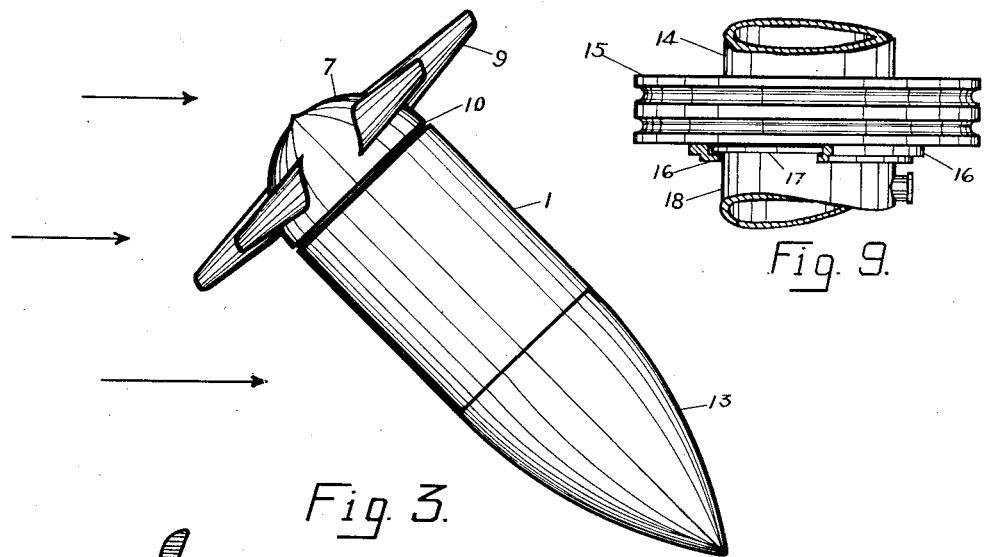
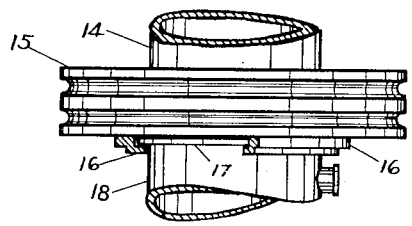
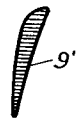
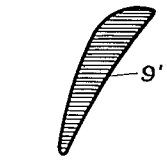
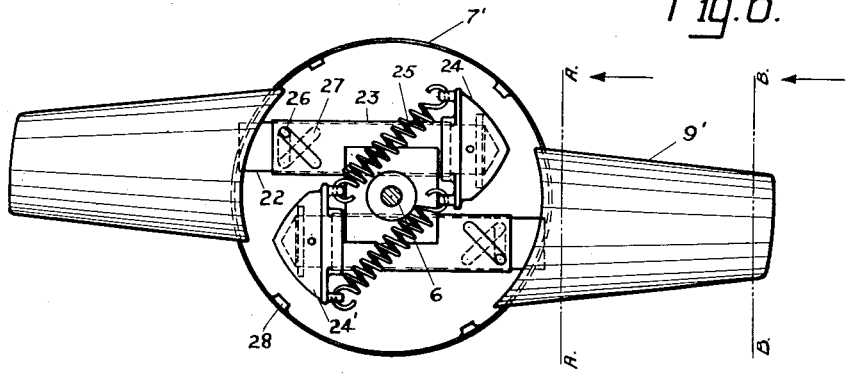
INVENTOR
ELMER A. SPERRY
BY
Herbert H. Thompson
ATTORNEY.

UNITED STATES PATENT OFFICE.

ELMER A. SPERRY, OF BROOKLYN, NEW YORK.

WIND-DRIVEN GENERATOR FOR AIRCRAFT.

1,362,753. Specification of Letters Patent. Patented Dec. 21, 1920.

Application filed December 2, 1916. Serial No. 134,562.

*To all whom it may concern:*

Be it known that I, ELMER A. SPERRY, a citizen of the United States of America, residing at 1505 Albemarle road, Brooklyn, in the county of Kings and State of New York, have invented certain new and useful Improvements in Wind-Driven Generators for Aircraft, of which the following is a specification.

This invention relates to a new and improved means for generating electric currents on aeroplanes and other swiftly moving vehicles. As has become the case with automobiles, electricity has been found to be an indispensible asset for aeroplanes also. It is being used for lighting signals and other lights, operating wireless transmission sets, operating the aeroplane controls through servo-motors, actuating various kinds of instruments for signaling to other machines or between the pilot and observer, operating gyroscopes or other stabilizing apparatus, and for charging engine starting batteries. The object of this invention is to provide a practicable means whereby a sure supply of electricity at a constant voltage may be obtained.

According to the present invention, it is proposed to drive a small generator by a windmill or a fan rotated by the wind caused by the rapid travel of the machine.

Figure 1:
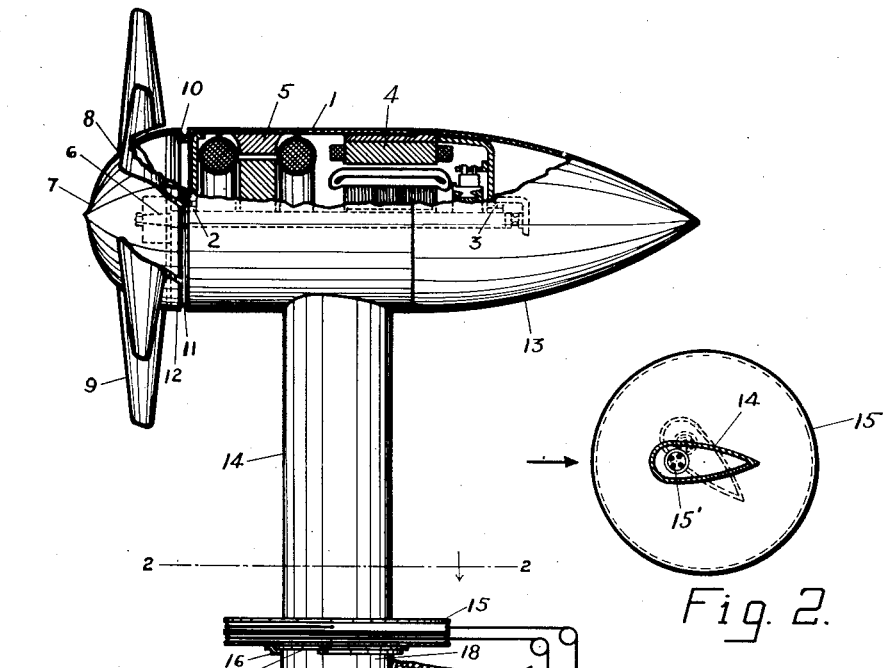
Figure 2:
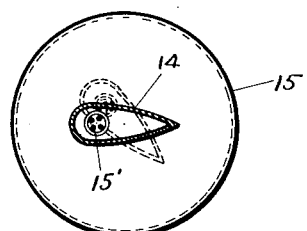
Figure 8:
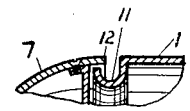
Figure 7:
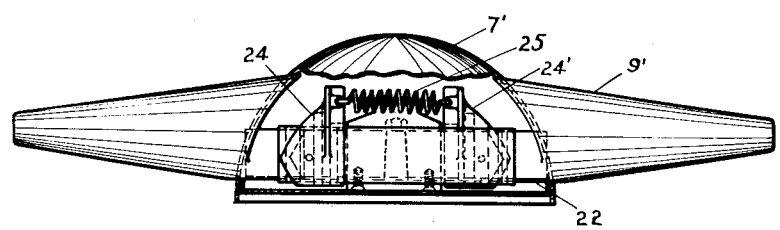

Referring to the drawings in which what I now consider to be the preferred forms of my invention are shown: Figure 1 is a side elevation partly in section of the generating unit as mounted on the aeroplane. Fig. 2 is a section of the supporting stem on line 2—2 of Fig. 1. Fig. 3 is a plan view of the generator showing it turned out of its normal position. Fig. 4 is a rear view of the fan showing the preferred construction of hub. Fig. 5 is a section of the blade on line B—B Fig. 4. Fig. 6 is a similar section on line A—A Fig. 4. Fig. 7 is a side elevation of a fan shown in Fig. 4 partly broken away. Fig. 8 is a detail, and Fig. 9 is an enlarged view of a portion of Fig. 1.

The generator proper is shown inclosed within tubular casing 1, which is preferably cylindrical. Said casing supports at its forward and rear ends the bearings 2 and 3 for the generator shaft. In the form of the invention shown, two machines are used to make up the dynamo of the electric machine employed consisting of a direct current generator 4, and an alternating current generator 5 of the inductor-alternator type. On the forward end of the generator shaft 6 is mounted the hub 7 and windmill 8. Said hub is designed especially to reduce the head wind resistance of the generator, and is preferably made of substantially as great diameter as the shell 1 of the generator. It is also preferably dome shaped or approximately hemispherical. A plurality of blades 9 project radially therefrom. Preferably I provide between said hub and the generator shell a waterproof joint 10; that is, a joint of such character that water which may be splashed upon the generator will not gain entrance into the interior. Said joint may consist of an angular depression 11 in the shell, the outer portion of which fits within rim 12 of the revolving hub.

The rear portion of the generator is also of stream line shape to reduce air resistance to minimum. It is shown as made up of detachable hollow tail piece 13, which fits over the rear portion of the generator 4 and is of a tapering shape. The generating unit is supported upon a hollow stem 14 also of stream line shape as shown in Fig. 2. The wires 15' leading into the generator are preferably brought up through the said stem. At its base said stem is preferably enlarged to form, or has secured thereto, bearing plate 15, which is provided at its under surface with a flanged ring 16. Said ring is adapted to engage over a flange 17 on a stem 18 secured to a strut 19 or other part of the aeroplane. A handle 20 may be provided to rotate said bearing plate 15 together with the generator at will. For this purpose wires 21 or other flexible connecting means are shown as connecting said handle with the said plate. When the generator is placed in line with the fore and aft line of the aeroplane, it is evident that it will be driven at maximum speed. This speed may be reduced at will by turning the generator and fan out of the said fore and aft line as indicated in Fig. 3, the arrows representing the direction of the wind. If turned far enough the fan may be stopped entirely or reversed.

The preferred construction for the fan and fan blades is shown in Figs. 4 to 7. The blades are preferably secured to or form a part of cylindrical stems 22 which are journaled within sleeves 23, fixed within the hollow hub. The blades are so designed that their centers of gyration lie on the opposite side of the center of shaft 6, from the fan portion of the blade. For this purpose I may secure to the stem 22 a mass 24. The blades are also yieldingly pressed outwardly by means of a spring or springs 25 which may extend between the mass 24 of one blade and the corresponding mass 24' on the opposite blade. A pin and slot connection 26, 27 may be provided between stem 22 and sleeve 23 so that longitudinal movement of the blade will also rotate it on its longitudinal axis. Stops 28 secured to the interior of hub 7 may be provided to limit the movement of the blades by engaging the masses 24—24'. By this construction it will readily be apparent on increase in the speed of the fan above a predetermined amount, that the blades will be drawn inwardly and at the same time rotated, thus both reducing the area of the exposed surface and increasing the angle of incidence whereby the resistance of the fan is decreased.

The blade itself is preferably of somewhat different design from standard blades used on aeroplane propellers and on electric fans and the like. I have found that in order to secure the maximum efficiency, that is, in order to secure the maximum power with the minimum head resistance, that the blade should taper toward its tip so that the quantity of air which is brought to rest by each unit of length of the fan approximates the same value. In other words, since the tip of the fan is revolving with much greater speed than the portion near the hub, it will intercept more air in the course of each revolution than the said hub portion of the same breadth, and hence will therefore do a greater portion of the work, if the blade is straight or flares outwardly, as is usually the case in fans. With such a design, the blade near the hub operates at poor efficiency.

I have also found that a long slender blade such as is usually employed in propellers is of a disadvantage in this character of work and that a short comparatively broad blade is preferred. It will be seen that it not only tapers in breadth toward its tip, but also tapers in thickness, the sections of the blades being designed with reference to the angle of incidence of the blade due to its helical trajectory through the air.

The comparatively large hub also possesses other advantages than acting as a stream-line wind shield for the generator. As above explained, the blades become inefficient as they approach the center unless they are broadened, and even when broadened, a point is reached when I find it preferable to discontinue the blade and merge it into a large hub, shaped to reduce head resistance. If the blades are run as close to the center as is generally done in propellers and electric fans, I find that the central part of the blade increases the head resistance of the fan out of all proportion to the added power secured. In addition mechanical difficulties are encountered in broadening a blade sufficiently if carried very close to the center.

In accordance with the provisions of the patent statutes, I have herein described the principle of operation of my invention, together with the apparatus, which I now consider to represent the best embodiment thereof, but I desire to have it understood that the apparatus shown is only illustrative and that the invention can be carried out by other means. Also, while it is designed to use the various features and elements in the combination and relations described some of these may be altered and others omitted without interfering with the more general results outlined, and the invention extends to such use.

Having described my invention, what I claim and desire to secure by Letters Patent is:

1. The combination with a wind driven generator for aeroplanes, of a tubular container for said generator having a tapering tail portion, a forward revoluble wind diverting portion fixed to the shaft of said generator, a fan blade mounted on said forward portion and constant speed governing means connected with said blade for governing the speed of said generator.

2. A wind driven generator for aeroplanes including a substantially cylindrical casing, a dynamo electric machine and bearings therefor supported within and by said casing, and a hollow stream line or tapering tail piece detachably secured to said shell.

3. The combination with a wind driven generator for aeroplanes, of a tubular container for said generator having a tapering tail portion, a forward revoluble wind diverting portion fixed to the shaft of said generator, a fan blade mounted on said forward portion, constant speed governing means for normally controlling the speed of said generator, and means for varying the angle of incidence of said fan blade for varying the speed of said generator.

4. The combination with a wind driven generator for aeroplanes, of a tubular container for said generator, a forward revoluble wind diverting portion fixed to the shaft of said generator, a fan blade mounted on said forward portion and constant speed governing means inclosed within said wind diverting portion and connected with said blade for governing the speed of said generator.

In testimony whereof I affix my signature.

ELMER A. SPERRY.